United States Patent [19]

Shimoda et al.

[11] Patent Number: 5,184,338
[45] Date of Patent: Feb. 2, 1993

[54] OPTICAL DISC SYSTEM WITH IMPROVED TRACK JUMPING OPERATION

[75] Inventors: Kyouzi Shimoda; Kyosuke Yoshimoto, both of Hyogo, Japan

[73] Assignee: Mitsubishi Denki Kabushiki Kaisha, Japan

[21] Appl. No.: 655,181

[22] Filed: Feb. 13, 1991

Related U.S. Application Data

[63] Continuation of Ser. No. 199,471, May 27, 1988, abandoned.

[30] Foreign Application Priority Data

Jun. 25, 1987 [JP] Japan .................. 62-156470

[51] Int. Cl.⁵ .............................................. G11B 7/085
[52] U.S. Cl. ................... 369/44.25; 369/44.28; 369/44.32; 369/54
[58] Field of Search ............ 369/19, 32, 44.25, 44.26, 369/44.28, 44.29, 44.32, 44.35, 54; 360/78.04, 78.06, 78.08, 78.09, 78.11; 358/907

[56] References Cited

U.S. PATENT DOCUMENTS

| | | | |
|---|---|---|---|
| 3,731,177 | 5/1973 | Commander et al. | 360/78.06 X |
| 4,381,526 | 4/1983 | McLaughlin et al. | 360/78.04 X |
| 4,423,497 | 12/1983 | Sugiyama et al. | 360/78.04 X |
| 4,547,822 | 10/1985 | Brown | 360/78.06 |
| 4,591,933 | 5/1986 | Quackenbush | 360/78.06 X |
| 4,607,358 | 8/1986 | Maeda et al. | 369/32 X |
| 4,677,602 | 6/1987 | Okano et al. | 369/32 |
| 4,695,989 | 9/1987 | Kimoto | 369/32 |
| 4,701,898 | 10/1987 | Giddings | 369/32 |
| 4,719,610 | 1/1988 | Bates et al. | 369/32 |
| 4,726,004 | 2/1988 | Takasago et al. | 369/32 X |
| 4,757,487 | 7/1988 | Yanagida et al. | 369/32 X |
| 4,811,316 | 3/1989 | Hosoya | 369/32 |
| 4,817,073 | 3/1989 | Suzuki | 358/907 X |
| 4,843,601 | 6/1989 | Eguchi et al. | 369/32 X |

OTHER PUBLICATIONS

Philips Technical Review, vol. 33, 1973, No. 7, "Control Mechanisms in the Philips VLP Record Player", pp. 190-193.

Primary Examiner—Wayne R. Young
Attorney, Agent, or Firm—Wolf, Greenfield & Sacks

[57] ABSTRACT

In an optical disc system having a tracking actuator for driving a light spot on an optical disc in a radial direction thereof; a photodetector for detecting off-track information in respect of the light spot position; a circuit for driving the tracking actuator and track-jumping the light spot to an adjacent track; an acceleration pulse generating circuit for generating an acceleration pulse signal to accelerate the tracking actuator during a track jumping operation; a deceleration pulse generating circuit for generating a deceleration pulse signal to decelerate the tracking actuator during the track jumping operation; and a center detecting circuit for detecting a center position between adjacent tracks in response to an output signal of the photodetector, the optical disc system is characterized by including a switching device responsive to an output signal of the center detecting circuit for switching from the acceleration pulse signal to the deceleration pulse signal after a predetermined period of time beginning at the start of the track jumping operation has lapsed.

3 Claims, 4 Drawing Sheets

OPTICAL DISC SYSTEM WITH IMPROVED TRACK JUMPING OPERATION

This application is a continuation, of application Ser. No. 07/199,471, filed May 27, 1988, now abandoned.

FIELD OF THE INVENTION

The present invention relates to an optical disc and, more particularly, to an optical disc system which can stably perform a light spot track jumping operation to play back any information from a disc.

DESCRIPTION OF THE RELATED BACKGROUND ART

FIG. 1 is a diagram showing signal waveforms in such a track jumping operation which may be obtained by using, e.g., an integrated circuit M51562P for a pickup servo system, which is of a kind produced by Mitsubishi Electric Corporation. An explanation of these signal waveforms is shown at page 11 of data sheets for Mitsubishi Linear Integrated Circuit M51562P. In the diagram, a waveform (a) denotes a drive current flowing through a tracking actuator coil. A waveform (b) indicates a tracking sensor signal which is obtained by an output signal from a photodetector provided in an optical pickup device. A waveform (c) denotes an output signal from a comparator which receives the tracking sensor signal (b) and a predetermined reference signal. A waveform (d) indicates a track jump command signal for determining the duration of a track jumping operation. A waveform (e) represents an acceleration pulse signal for a tracking actuator. A waveform (f) denotes a deceleration pulse signal for the tracking actuator.

The track jumping operation of a conventional optical disc system will now be described with reference to FIG. 1. First, the acceleration pulse signal (e) for the tracking actuator is generated simultaneously with the leading edge of the track jump command signal (d) which has been output from a microcomputer in the optical disc system. Then, the tracking servo loop is opened, so that a difference signal between the acceleration pulse signal (e) and the deceleration pulse signal (f) is applied to a tracking actuator drive circuit through a gain amplifier. Thus, an acceleration current flows through a tracking actuator coil to thereby drive the tracking actuator. As the light spot traverses a track, a track traverse signal is caused as the tracking sensor signal (b). When the light spot has traversed the half track, the tracking sensor signal (b) crosses the zero level. This zero crossing point is detected by the leading edge of the comparator output signal (c) of the tracking sensor signal (b), so that the acceleration pulse signal (e) of the tracking actuator is completed and, at the same time, the deceleration pulse signal (f) is generated.

At this time, a deceleration current in the direction opposite to that of the acceleration current flows through the tracking actuator drive coil. The tracking actuator continuously moves in the same direction as that upon acceleration while its speed is reduced. When the speed of the tracking actuator approaches zero due to this deceleration, the light spot reaches the center between the adjacent tracks and the tracking sensor signal (b) again crosses the zero level. When this zero crossing is detected by the comparator output signal (c) of the tracking sensor signal (b), the deceleration pulse signal (f) of the tracking actuator is terminated. The tracking jump command signal (d) is also completed at this time and the tracking servo loop is closed. Thus, the track jumping operation is completed.

According to the foregoing conventional optical disc system, the switching from the acceleration pulse signal to the deceleration pulse signal is performed solely on the basis of the detection of the zero crossing point of the output signal of the photodetector. This leads to the following problems. When the tracking sensor signal fluctuates due to disturbance caused by any defect on an optical disc medium, a vibration caused by a disc motor, or the like, the zero crossing point appears before the movement of the half track of the light spot (i.e., in the case of an erroneous detection), so the acceleration time becomes too short and the deceleration time becomes long. As a result, the light spot cannot reach the adjacent track and the track jumping operation fails.

SUMMARY OF THE INVENTION

The present invention aims to solve the foregoing problems and it is an object of the invention to provide an optical disc system in which even if the tracking sensor signal fluctuates due to disturbance caused by any defect on an optical disc medium, a vibration caused by a disc motor, or the like, and the center between the adjacent tracks is erroneously detected by a position detection signal before a light spot reaches the center between adjacent tracks, a track jumping operation can be stably performed.

Another object of the present invention is to provide an optical disc system comprising an acceleration pulse generating circuit for generating an acceleration pulse signal adapted to accelerate a tracking actuator in a track jumping operation; a deceleration pulse generating circuit for generating a deceleration pulse signal adapted to decelerate the tracking actuator; a center detecting circuit for detecting the center between adjacent tracks from an output signal of a photodetector; and a switching circuit for switching the acceleration pulse signal to the deceleration pulse signal within a predetermined period of time, in response to an output signal from the center detecting circuit.

According to the invention, if the zero crossing point for determining the switching timing from the accelerration pulse signal to the deceleration pulse signal is erroneously detected due to fluctuation of the tracking sensor signal after the start of the track jumping operation the misdetection is ignored (1) for a predetermined period of time or (2) for a period of time until the track position detection level exceeds a predetermined level and then the switching between the acceleration signal and the deceleration signal is executed at the true, zero crossing point to be detected later. Thus, the track jumping operation can be reliably performed and, therefore, the reliability of the optical disc system is improved.

DETAILED DESCRIPTION OF THE PREFERRED EMBODIMENTS

Figure 2:
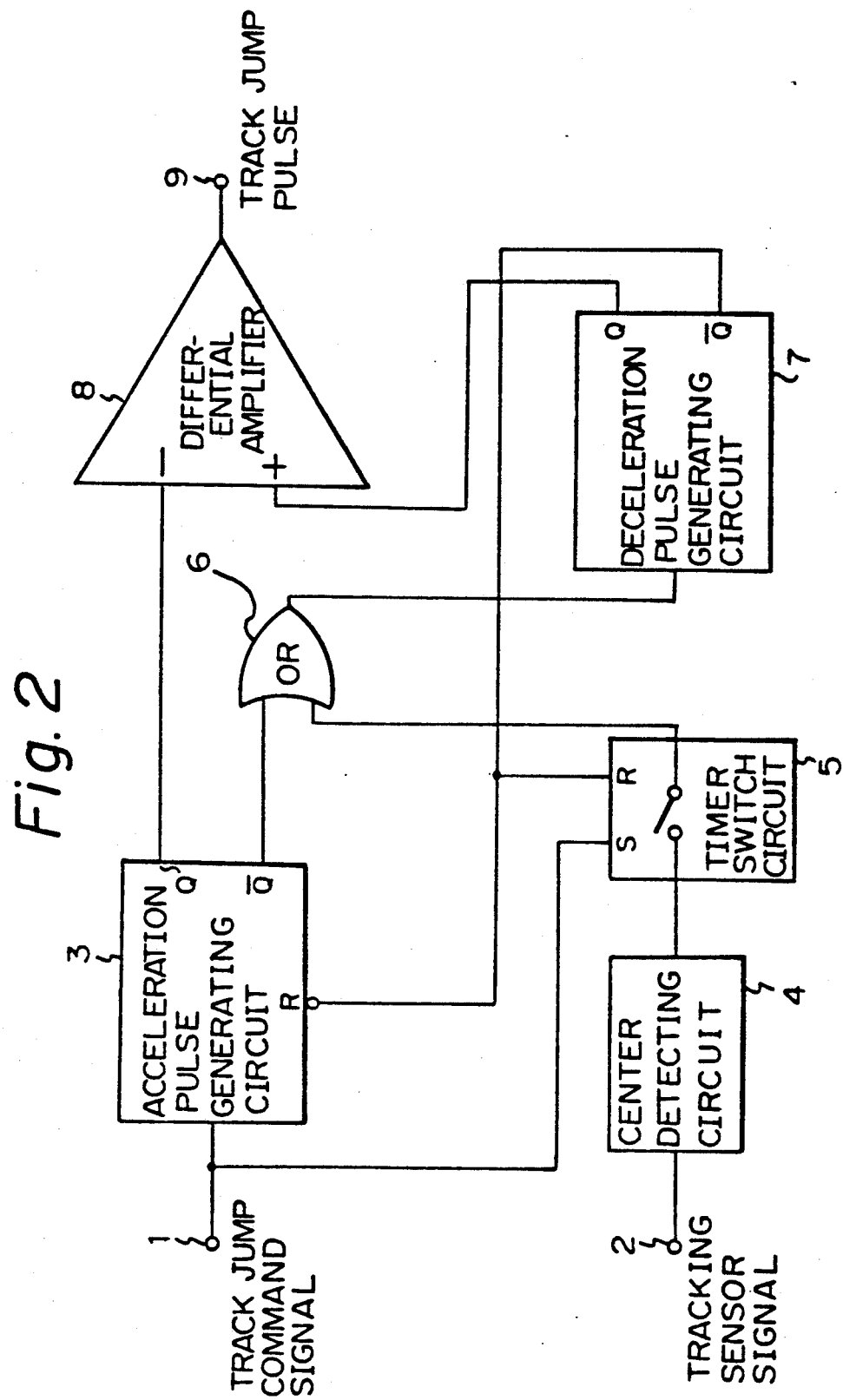
FIG. 2 is a block diagram of a track jumping circuit in an optical disc system according to an embodiment of the present invention.

FIG. 2 is a block diagram showing a track jumping circuit in an optical disc system according to an embodiment of the present invention. In the diagram, an acceleration pulse generating circuit 3 is connected to an input terminal 1 of a track jump command signal. When a leading edge of the track jump command signal is input to the input terminal 1, the generating circuit 3 outputs an acceleration pulse. A center detecting circuit 4 adapted to detect the center between adjacent tracks is connected to an input terminal 2 of a tracking sensor signal and detects the center between adjacent tracks from the tracking sensor signal. A timer switch circuit 5 is connected to the generating circuit 3 and detecting circuit 4 and is also connected to one input terminal of an OR circuit 6. The timer switch circuit 5 operates to turn on after the expiration of a predetermined period of time which has been set as a time which is no longer than the time required for the light spot to reach the center between adjacent tracks from a position corresponding to the leading edge of the track jump command signal. On the other hand, the other input terminal of the OR circuit 6 is connected to an inverting output terminal of the acceleration pulse generating circuit 3, so that the OR circuit 6 operates to "or" the inverted output and an output of the timer switch circuit 5. An input terminal of a deceleration pulse generating circuit 7 is connected to an output terminal of the OR circuit 6. An output terminal of the generating circuit 7 is connected to a differential amplifier 8 and to the acceleration pulse generating circuit 3. In response to an output signal of the OR circuit 6, the generating circuit 7 generates a deceleration pulse signal. Input terminals of the differential amplifier 8 are connected to the generating circuits 3 and 7. An output terminal of the amplifier 8 is connected to an output terminal 9 of a track jump pulse output. In response to the acceleration and deceleration pulse signals, the amplifier 8 generates an actuator drive signal.

The operation of the track jumping circuit in the optical disc system, constituted as explained above, will now be described.

At the start of the track jumping operation, if the center detecting circuit 4 is made operative by the fluctuation of the tracking sensor signal, since the timer switch circuit 5 is in the OFF state, the deceleration pulse generating circuit 7 connected to the output of the OR circuit 6 cannot be triggered by the output of the detecting circuit 4 and the acceleration pulse signal is continuously output. When the central position between adjacent tracks is detected after the period of time set in the timer switch circuit 5 has elapsed, since the timer switch circuit 5 is in the ON state, the deceleration pulse generating circuit 7 is triggered by the output of the timer switch circuit 5 and, therefore, the output of OR circuit 6. Thus, a stable track jumping operation can be performed by switching between the acceleration pulse signal and the deceleration pulse signal.

Figure 3:
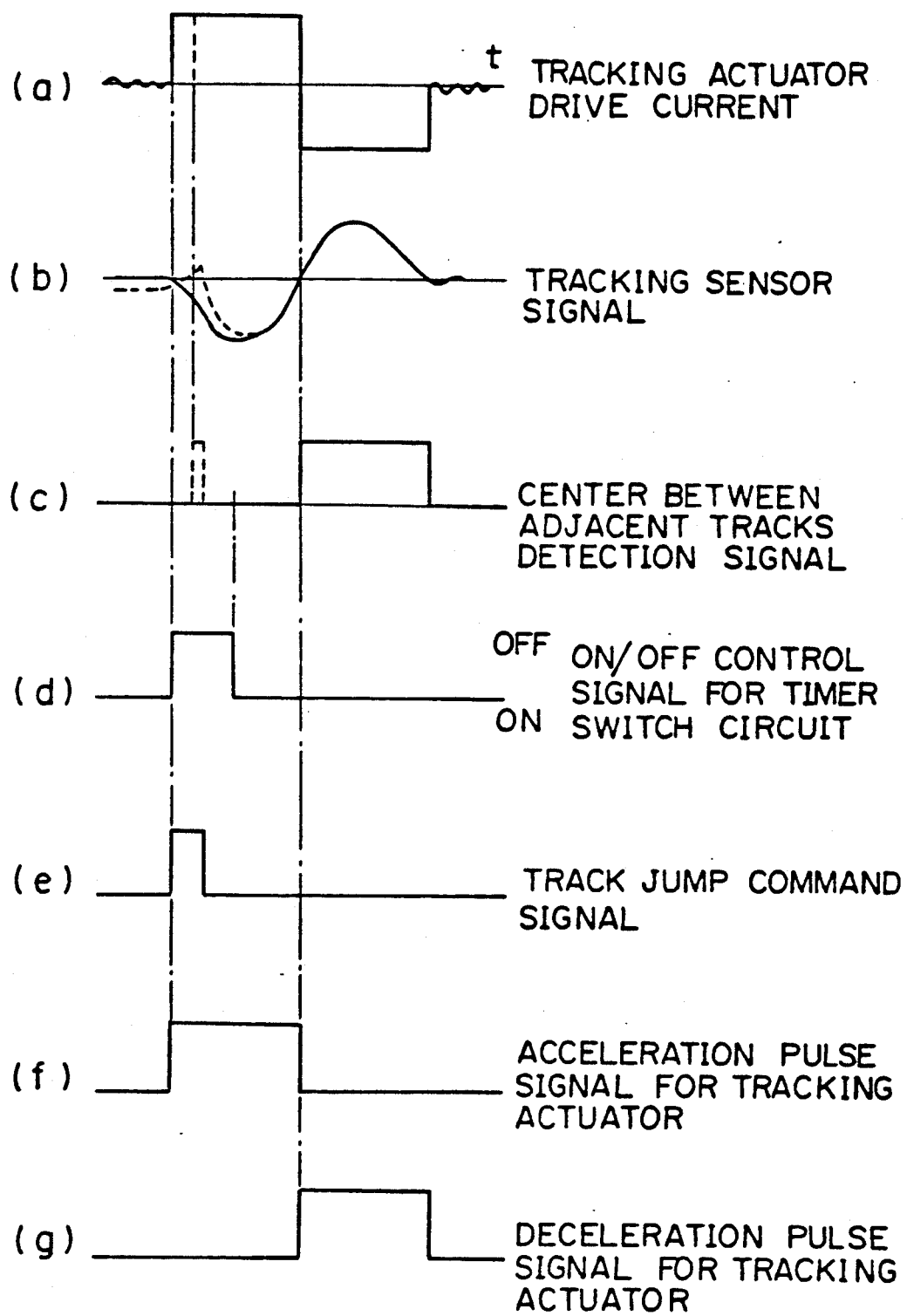
FIG. 3 is a signal waveform diagram of the track jumping operation of the circuit in FIG. 2.

FIG. 3 is a diagram showing signal waveforms in the track jumping operation which are obtained by use of the track jumping circuit shown in FIG. 2. In the diagram, a waveform (a) denotes a tracking actuator drive current. A waveform (b) indicates a tracking sensor signal. A waveform (c) represents a center detection signal representing detection of the center between adjacent tracks, which is derived from the tracking sensor signal (b) through the center detecting circuit 4. A waveform (d) denotes an ON/OFF control signal for the timer switch circuit to control the connection between the output of the center detecting circuit 4 and the input of the OR circuit 6. A waveform (e) denotes a track jump command signal. A waveform (f) represents an acceleration pulse signal for the tracking actuator, which is the output signal of the acceleration pulse generating circuit 3. A waveform (g) denotes a deceleration pulse signal for the tracking actuator, which is the output signal of the deceleration pulse generating circuit 7.

A detailed explanation will now be made with reference to FIG. 3 with respect to track jumping operations in the cases where the tracking sensor signal (b) does not fluctuate and the zero crossing point can be detected, and where the tracking sensor signal (b) does fluctuate, respectively.

(1) Where the tracking sensor signal (b) does not fluctuate and the zero crossing point can be detected The signals shown by solid lines in FIG. 3 are derived in this case. When the track jump command signal (e) rises, the servo loop is simultaneously opened and then the acceleration pulse signal (f) for the tracking actuator rises, so that an acceleration current flows through the tracking actuator drive coil to drive the tracking actuator. In response to the operation of the tracking actuator, a track traverse signal is caused as the tracking sensor signal (b). When the light spot has traversed the half track, the tracking sensor signal (b) crosses the zero level to thereby generate the center detection signal (c) which is representative of the center position between adjacent tracks. By detection of the leading edge of this signal, the deceleration pulse signal (g) for the tracking actuator is generated while the acceleration pulse signal (f) is reset. The phase of the deceleration pulse signal (g) is reversed by the differential amplifier 8 shown in FIG. 2. A deceleration current in the direction opposite to that of the acceleration current flows through the tracking actuator drive coil. The tracking actuator continuously moves as it decelerates. As the light spot is correspondingly decelerated, the deceleration pulse signal (g) is maintained. After a predetermined period of time in which the light spot is allowed to reach the next track, the signal (g) is completed. Then, the servo loop is closed.

(2) Where the tracking sensor signal (b) does fluctuate

In this case, the signals of the waveforms shown by broken lines in FIG. 3 are obtained. Until the track jumping operation is started, the tracking sensor signal (b) fluctuates within a small amplitude around the zero level, due to any disturbance variable relative to the servo system, such as the vibration of the optical disc which may be caused by defects on the optical disc medium or the vibration of the disc motor or the like. Therefore, if, particularly at the start of the track jumping operation, the tracking sensor signal (b) includes a tracking servo residual error in the direction opposite to the direction of acceleration due to the disturbance variable relative to the servo, the signal waveform (b) shown by a broken line in FIG. 3 crosses the zero level so as to generate an undesired or false center detection signal (c), which is also shown by a broken line in FIG. 3.

The false center detection signal (c) generated in this manner is effectively masked by the ON/OFF control signal (d) for the timer switch circuit 5 during the predetermined period of time in which the timer switch circuit 5 is turned off. Thus, the normal track jumping operation can be executed. If the timer switch circuit 5 is not provided, the acceleration pulse signal (f) for the tracking actuator is unexpectedly cut out at the leading edge of the false center detection signal (c) shown by the broken line. As a result, the deceleration pulse signal (g) for the tracking actuator is generated and then the light spot returns to the original track or moves to the track on the side opposite to the target track. This results in failure of the track jumping operation.

Although the invention has been described with respect to the embodiment in which the timer switch circuit 5 is connected to the output of the center detecting circuit 4, the same effect as that provided by the foregoing embodiment can also be accomplished by another embodiment of the invention, which will be explained hereinafter.

Figure 4:
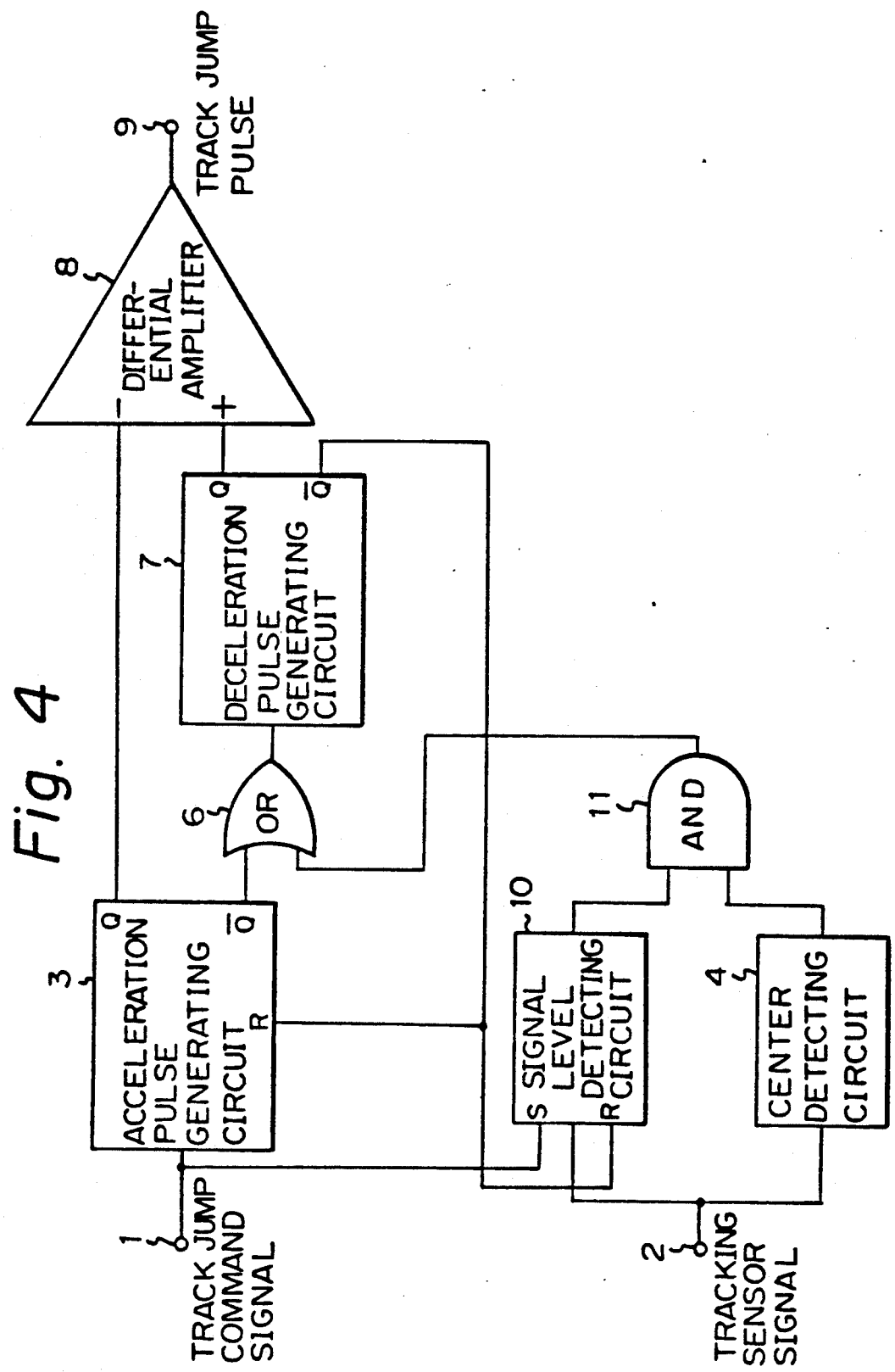
FIG. 4 is a block diagram of a track jumping circuit in an optical disc system according to another embodiment of the invention.

FIG. 4 is a block diagram showing a track jumping circuit in an optical disc system according to another embodiment of the invention. In the diagram, the same parts and components as those shown in FIG. 2 are designated by the same reference numerals. One input terminal of a signal level detecting circuit 10 is connected to the input terminal 1 of the track jump command signal. The other input terminal of the detecting circuit 10 is connected to the inverting output terminal of the deceleration pulse generating circuit 7. The operation of the detecting circuit 10 is started in response to the track jump command signal (e). The detecting circuit 10 outputs a logic signal when the tracking sensor signal (b) exceeds a predetermined level. When an AND circuit 11 receives both the output of the signal level detecting circuit 10 and the output of the center detecting circuit 4, it generates a signal whereby the tracking actuator is switched from the acceleration mode to the deceleration mode.

The operation of the circuit shown in FIG. 4 will now be explained.

Figure 1:
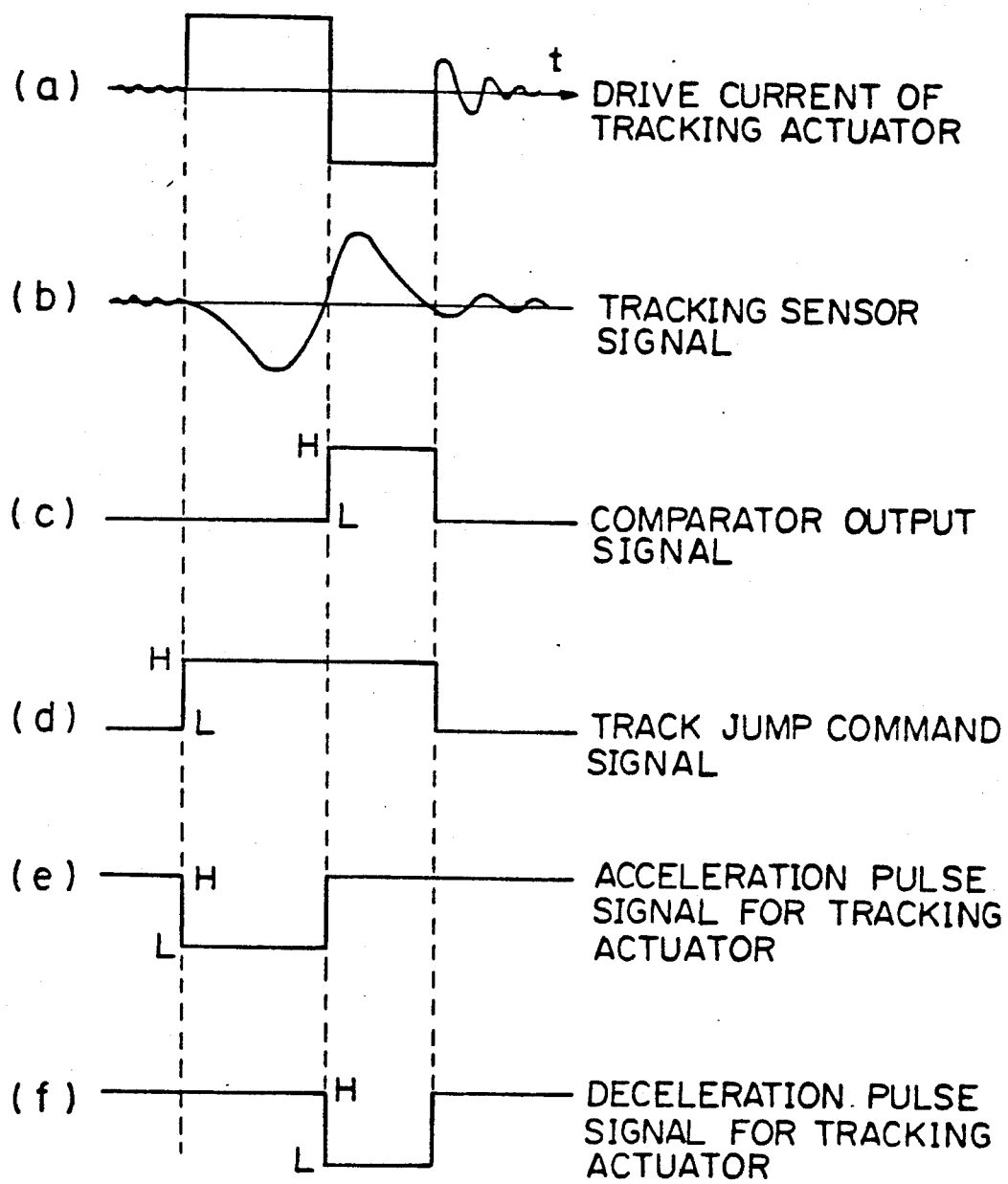
FIG. 1 is a signal waveform diagram of the track jumping operation obtained by a track jumping circuit in a conventional optical disc system.

Prior to the start of the track jumping operation, a residual amount of tracking servo error, as described above, is small enough compared with the maximum amplitude of the tracking sensor signal (b) while the light spot traverses the track. Therefore, if the center detecting circuit 4 outputs the false center detection signal (c) due to the residual amount of the tracking servo error at the start of the track jumping operation, the signal level detecting circuit 10 does not output a detection signal, the detection level of which having previously been set to the level of the tracking sensor signal (b) which is given before the light spot is moved by ¼ track where the amplitude of the light spot reaches its maximum value. Thus, the switching operation between the acceleration mode and the deceleration mode is not performed through the AND circuit 11. During the track jumping operation, the normal switching point from the acceleration mode to the deceleration mode is located after the amplitude of the tracking sensor signal (b) exceeds the level set in the signal level detecting circuit 10. Then, by processing the outputs of the signal level detecting circuit 10 and the center detecting circuit 4 by the AND circuit 11, the operating mode is switched from acceleration to deceleration. It is to be noted that the same effects as those of the embodiment of the invention shown in FIG. 1 can thus be accomplished.

Although the embodiment of FIG. 4 is different in constitution from the embodiment of FIG. 2, the reliability of track jumping can be raised by combining these two embodiments.

What is claimed is:

1. An optical disc system having:
   tracking actuator means for positioning a light spot on an optical disc in a radial direction thereof;
   photodetector means for generating a trackigns ensor signal to detect off-track information with respect to the position of said light spot on said optical disc;
   circuit means for causing said tracking actuator means to jump said light spot from its present position on a track to a position on an adjacent track;
   acceleration pulse generating means for generating a signal to cause acceleration of said tracking actuator means during a track jumping operation;
   deceleration pulse generating means for generating a signal to cause deceleration of said tracking actuator means during said track jumping operation; and
   center detecting means for detecting when the said light spot is at the midpoint between adjacent tracks in response to a zero crossing point of said trackign sensor signal,
   said optical disc system characterized by including switching means responsive to an output signal of said center detecting means for switching control from said acceleration pulse means to said deceleration pulse means after a period of time has elapsed from the start of said track jumping operation, so that a false detection of the zero crossing point of said tracking sensor signal is prevented during said time period,
   signal level detecting circuit means responsive to said tracking sensor signal and having a detection level which is smaller than the level which corresponds to the maximum amplitude of said tracking sensor signal, whereby said time period is provided by the time period required for said tracking sensor signal to reach said detection level from the start of said track jumping operation.

2. An optical disc system having:
   tracking actuator means for positioning a light spot on an optical disc in a radial direction thereof;
   photodetector means for generating a trackigns ensor signal to detect off-track information with respect to the position of said light spot on said optical disc;
   circuit means for causing said tracking actuator means to jump said light spot from its present position on a track to a position on an adjacent track;
   acceleration pulse generating means for generating a signal to cause acceleration of said tracking actuator means during a track jumping operation;
   deceleration pulse generating means for generating a signal to cause deceleration of said tracking actuator means during said track jumping operation; and
   center detecting means for detecting when the said light spot is at the midpoint between adjacent tracks in response to a zero crossing point of said trackign sensor signal,
   said optical disc system characterized by including switching means responsive to an output signal of said center detecting means for switching control from said acceleration pulse means to said deceleration pulse means after a period of time has elapsed from the start of said track jumping operation, so that a false detection of the zero crossing point of said tracking sensor signal is prevented during said time period, wherein said switching means includes means for defining said period of time during which said switching means inhibits switching from acceleration to deceleration and said period of time is a function of the tracking sensor signal reaching a detection level from the start of the track jumping operation.

3. An optical disc system having:
a) a tracking actuator means for positioning a light spot on an optical disc in a radial direction thereof;
b) photodetector means for generating a trackigns ensor signal to detect off-track information with respect to the position of said light spot on said optical disc;
c) jumping means for causing said tracking actuator means to jump said light spot from its present position on a track to a position on an adjacent track;
d) an acceleration pulse generating means for generating a signal to cause acceleration of said tracking actuator means during a track jumping operation;
(e) a center detecting means for detecting a zero crossing point of said tracking sensor signal and generating a zero crossing signal when the zero crossing point is detected;
f) a deceleration pulse generating means for generating a signal to cause deceleration of said tracking actuator means in response to receiving the zero crossing signal;
g) blocking means coupled between the center detecting means and the deceleration pulse generating means for blocking passage of the zero crossing signal to the deceleration pulse generating means during a time interval, said blocking means further comprising:
i) a level detector for detecting a level of the tracking sensor signal; and
ii) means for blocking the zero crossing signa until the level of the tracking sensor signal exceeds a predetermined threshold.

* * * * *